(12) United States Patent
Hart et al.

(10) Patent No.: US 12,520,247 B2
(45) Date of Patent: Jan. 6, 2026

(54) PREEMPTION VIA LOW AND HIGH POWER STATES IN A WIRELESS NETWORK (71) Applicant: Cisco Technology, Inc., San Jose, CA (US)

(72) Inventors: Brian D. Hart, Sunnyvale, CA (US); Matthew A. Silverman, Shaker Heights, OH (US); Malcolm M. Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 438 days.

(21) Appl. No.: 18/309,710

(22) Filed: Apr. 28, 2023

(65) Prior Publication Data

US 2024/0365247 A1    Oct. 31, 2024

(51) Int. Cl.
*H04W 52/28* (2009.01)
*H04W 28/02* (2009.01)

(52) U.S. Cl.
CPC ..... *H04W 52/281* (2013.01); *H04W 28/0268* (2013.01)

(58) Field of Classification Search
CPC ......... H04W 28/0221; H04W 28/0268; H04W 52/0209; H04W 52/281; H04W 72/569; H04W 84/12
See application file for complete search history.

(56) References Cited

U.S. PATENT DOCUMENTS

| | | | |
|---|---|---|---|
| 2018/0027453 A1 | 1/2018 | Viger et al. | |
| 2020/0367263 A1 | 11/2020 | Cavalcanti et al. | |
| 2020/0367278 A1* | 11/2020 | Hosseini | H04W 76/27 |
| 2021/0084667 A1* | 3/2021 | Bravo | H04W 72/569 |
| 2021/0392506 A1* | 12/2021 | Luong | H04W 74/006 |
| 2021/0400591 A1 | 12/2021 | Zhou et al. | |
| 2022/0078844 A1 | 3/2022 | Cherian et al. | |
| 2022/0123880 A1 | 4/2022 | Cavalcanti et al. | |
| 2023/0115377 A1 | 4/2023 | Shafin et al. | |

FOREIGN PATENT DOCUMENTS

WO    2020187031 A1    9/2020

OTHER PUBLICATIONS

International Search Report and Written Opinion for International Application No. PCT/US2024/025019, mailed Jul. 1, 2024, 17 Pages.

* cited by examiner

*Primary Examiner* — Kashif Siddiqui
(74) *Attorney, Agent, or Firm* — Patterson + Sheridan, LLP (57) ABSTRACT

A preemption service in a wireless network is described. The preemption network increases the reliability of preemption traffic to be quickly delivered over the wireless network. The active preemption service in wireless networks causes the devices in a wireless network to enter a low transmit power state where every device transmits at a power lower than a high or maximum transmission power. Preemption traffic is transmitted from authorized devices at a high or maximum power, over the lower power transmissions, in order to provide an increased guarantee that the preemption traffic will arrive at the intended recipient.

20 Claims, 7 Drawing Sheets

PREEMPTION VIA LOW AND HIGH POWER STATES IN A WIRELESS NETWORK

TECHNICAL FIELD

Embodiments presented in this disclosure generally relate to wireless communications. More specifically, embodiments disclosed herein provide for traffic preemption in wireless communication networks using various transmission power states at connected devices in the network.

BACKGROUND

Communication networks increasingly include wireless connections between various nodes or connection points (e.g., wireless clients, wireless devices, etc.) in the network. In some cases, these wireless connections provide network connections for applications that rely on time sensitive network communication. For example, applications may execute on a client device in a wireless network, where the application requires a very small latency in network traffic sent and received from the application in order to execute the application functions properly. Providing improved traffic latency via traffic preemption in wireless networks remains a challenge.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method also includes advertising, at an access point (AP), a preemption service capability for a basic service set (BSS) associated with the AP, and upon receiving an authorization request from a client device in the BSS, authorizing the client device to transmit preempting traffic at a high power during a preemption state. The method also includes activating the preemption state for the BSS by causing a plurality of client devices in the BSS to enter a low transmit power state to provide for preempting traffic in the BSS, receiving preempting (UL) traffic at the AP from the authorized client device that was transmitted at the high power, and transmitting control response frames from the preempting UL traffic from the authorized client device as preempting response transmissions. Other embodiments of this aspect include corresponding computer systems, apparatus, and computer programs recorded on one or more computer storage devices, each configured to perform the actions of the methods.

One general aspect includes a method. The method also includes determining, at a client device, a preemption service capability is available for a basic service set (BSS) associated with an access point (AP), transmitting an authorization request to the AP, and receiving a preemption authorization from the AP. The method also includes, upon receiving an indication of an active preemption state for the BSS, transmitting non-preempting traffic in a low transmit power state, transmitting preempting uplink (UL) traffic to the AP over non-preempting traffic in the BSS at a high transmission power, and receiving preempting response transmission from the AP. Other embodiments of this aspect include corresponding computer systems, apparatus, and computer programs recorded on one or more computer storage devices, each configured to perform the actions of the methods.

One general aspect includes an access point (AP). The access point also includes a processor; and a memory may include instructions which, when executed on the processor, performs an operation. The operation may include: advertising a preemption service capability for a basic service set (BSS) associated with the AP, and upon receiving an authorization request from a client device in the BSS, authorizing the client device to transmit preempting traffic at a maximum power during a preemption state. The operation also includes activating the preemption state for the BSS by: causing a plurality of client devices in the BSS to enter a low transmit power state to provide for preempting traffic in the BSS; receiving preempting (UL) traffic at the AP from the authorized client device, and transmitting control response frames from the preempting UL traffic from the authorized client device as preempting response transmissions. Other embodiments of this aspect include corresponding computer systems, apparatus, and computer programs recorded on one or more computer storage devices, each configured to perform the actions of the methods.

EXAMPLE EMBODIMENTS

With the increase of mobile devices (e.g., smart phones, tablet devices, etc.), Internet of Things (IoT) devices, and non-stationary network connected devices, the use of wireless networks to provide network connections has also increased. As the various types of wireless network connected devices increase, the types of applications executing on the devices has also increased. In some examples, these applications rely on time sensitive or low latency network communications in order to function properly.

In some cases, wireless networks, including Wi-Fi wireless local area networks (WLANs), provide various priority and traffic handling mechanisms to provide greater reliability and lower latency for time sensitive applications in the network compared to non-time sensitive applications. For example, some mechanisms include random contention and various backoff/counters to allow higher priority network traffic to access network resources and communication channels quickly. However, preemption in wireless networks remains a challenge, since transmissions over the air may contend with other transmissions and not reliably arrive at an intended recipient in time.

The systems and methods described herein provide for a preemption service in a wireless network which increases the reliability of preemption traffic to be quickly delivered over the wireless network. The active preemption service in wireless networks causes the devices in a wireless network to enter a low transmit power state where every device transmits at a power lower than a maximum transmission power. Preemption traffic is transmitted from authorized devices at a high or maximum power, over the lower power transmissions, in order to provide an increased guarantee that the preemption traffic will arrive at the intended recipient. A wireless network with a preemption service is described in more detail in relation to FIG. 1.

Figure 1:
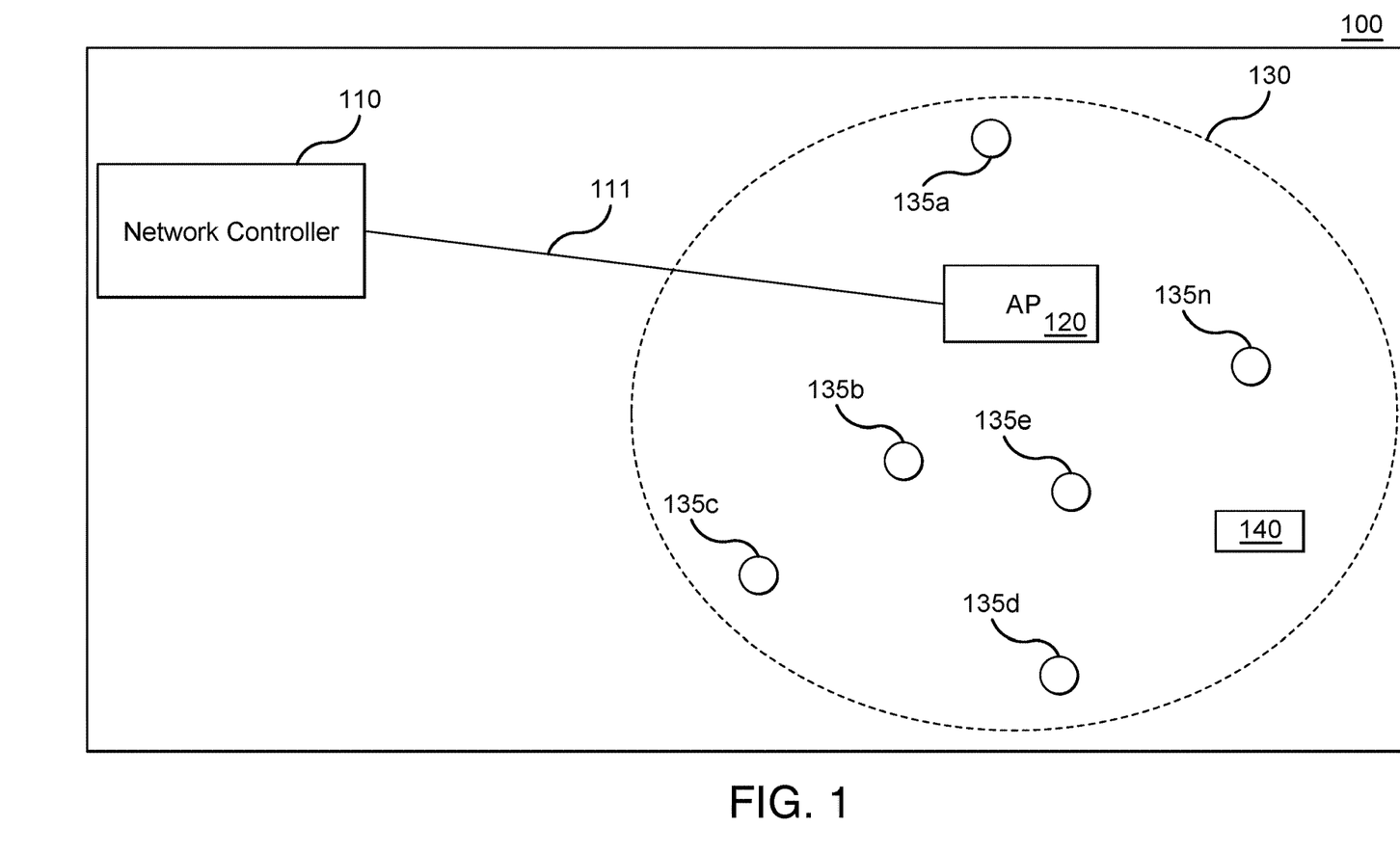
FIG. 1 illustrates a network, according to one embodiment described herein.

FIG. 1 illustrates a network 100, according to one embodiment described herein. The network 100 includes a network controller 110 and AP 120, where the AP 120 is connected to the network controller 110 via connection 111. The connection 111 may include wired or wireless connections which provide network access and control between the network controller 110 and the APs. In some examples, the network 100 is a Wi-Fi 8 (or other similar network protocol) WLAN providing network connection to the AP 120 and various connected client devices. For example, devices 135a-135n (collectively devices 135) and device 140 are Wi-Fi devices or client devices connected to the AP 120 as part of a basic service set (BSS) for network connections in the network 100 and external networks. In some examples, the devices 135a-135n and device 140 include a variety of devices such as user devices (e.g., mobile phones, laptops, etc.), IoT devices (e.g., smart devices, etc.), and other similar client or network devices. In some examples, the devices 135a-135n and device 140 are part of BSS 130 and are connected to the AP 120 of BSS 130.

In some examples, the AP 120 provides and manages a preemption service for the BSS 130. The preemption service provides for, at any time, any connected device (e.g., the device 140) or the AP 120 to transmit a vital frame or communication and with an increased chance or guarantee that the transmitted communication will be transmitted into the medium (e.g., the WLAN) within a short period of time and for the transmission to be received at its intended recipient. Providing a guarantee that the transmission is received at the intended recipient can be challenging as shown in FIG. 2A which illustrates transmissions in a wireless network where a preemption service is not active, according to one embodiment described herein.

Figure 2A:
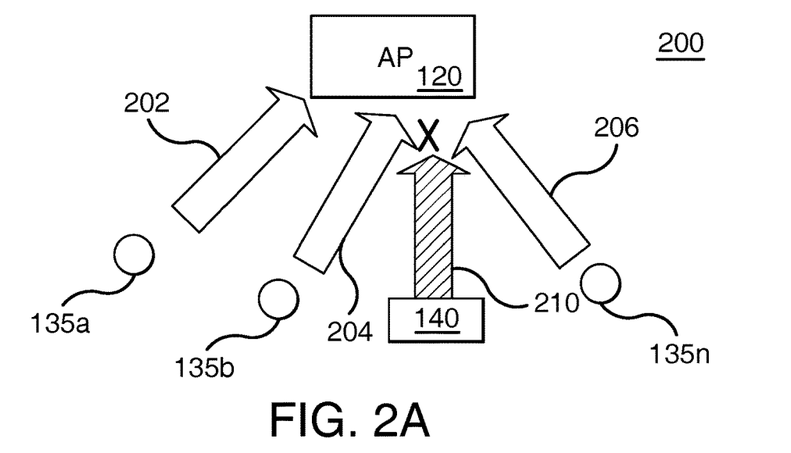
FIGS. 2A-C illustrate transmissions in a wireless network, according to embodiments described herein.

For example, in arrangement 200 in FIG. 2A, each of the devices 135a-135n is communicating with the AP via transmissions 202, 204, and 206 and the device 140 is communicating with the AP 120 via transmissions 210. In some examples, each of the devices 135a-135n and the device 140 are transmitting at a maximum transmission (Tx) power for each respective device. For example, the device 135a transmits at a maximum Tx power that the device 135a is capable of and authorized to transmit. In an example where the device 140 determines that a frame is a vital frame, the device 140 may locally prioritize the transmission of the vital frame in the transmissions 210. For example, the device 140 wirelessly transmits the vital frame to the AP 120 at a first opportunity. However, the prioritization of the vital frame from the device 140 does not guarantee that the frame is received at the AP 120 within a time or latency requirement from the application. For example, when a preemption service is not active, the transmission from the device 140 may fail to be received at the AP 120 due to any of the transmissions 202, 204, or 206 on the same channel being received and processed by the AP 120. In this case, the vital frame in the transmission 210 may be missed or dropped by the AP 120, which may cause errors in the latency sensitive application on the device 140.

Returning back to FIG. 1, in order to mitigate contention in the BSS 130 and to provide for vital frames to be quickly routed through the network 100, the AP 120 provides a preemption service for the BSS 130. For example, the AP 120 advertises a preemption service capability to every device in the BSS 130, authorizes various devices, such as the device 140, to utilize the preemption services, and activates the preemption service at all the devices in the BSS 130, including the devices 135a-135n and 140. Upon activation, each of the client devices in the BSS 130 enters a low transmit power state.

Figure 2B:
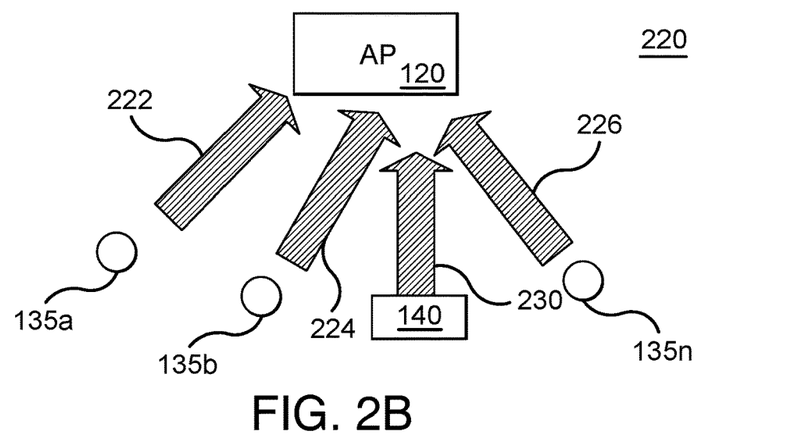

For example, FIG. 2B illustrates transmissions in a wireless network with a preemption service activated, according to embodiments described herein. In arrangement 220 of FIG. 2B, each of the devices 135a-135n is communicating with the AP 120 via transmissions 222, 224, and 226 and the device 140 is communicating with the AP 120 via transmissions 230. In some examples, each of the devices 135a-135n and the device 140 are transmitting at a Tx power lower than a capable maximum power. For example, the lower transmit power state at each device in the BSS 130 may include transmitting network traffic at 15-20 decibels (dB) less than a respective maximum transmission power. In some examples, the low transmit power state is only entered upon activation of the preemption service for the BSS 130. For example, when a preemption service is not active in the BSS 130, the devices transmit according to a maximum or preferred power as shown in FIG. 2A. The devices transmitting in a low transmit power state in FIG. 2B allow for communication 250 to be transmitted over the lower transmit power communications and to be delivered at an intended recipient as shown in FIG. 2C.

Figure 2C:
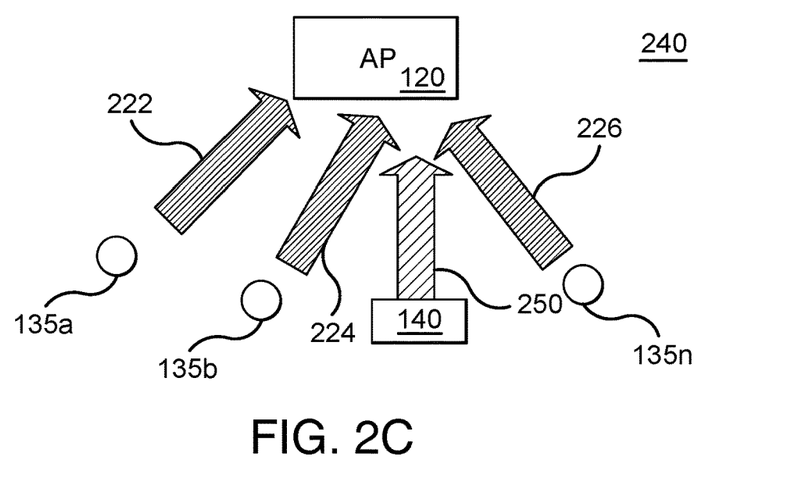

FIG. 2C illustrates transmissions, including a preemption transmission in a wireless network, according to embodiments described herein. For example, in arrangement 240 of FIG. 2C, each of the devices 135a-135n continues communicating with the AP 120 via transmissions 222, 224, and 226. The device 140 transmits preemption traffic via communication 250 to the AP 120 at a higher or maximum power of the device 140 and at least over the Tx power of transmissions 222, 224, and 226. The transmission of the communication 250 at the maximum power increases the reliability of the preemption traffic being received over communications from the other devices in the BSS 130. In one embodiment, the power of the transmissions 222/224/226 is controlled such they arrive at much the same received power at AP 120. In some examples, the preemption traffic transmitted from the device 140 or the AP 120 is also marked to indicate that the traffic is preemption traffic as shown in FIGS. 3A-3B.

Figure 3A:
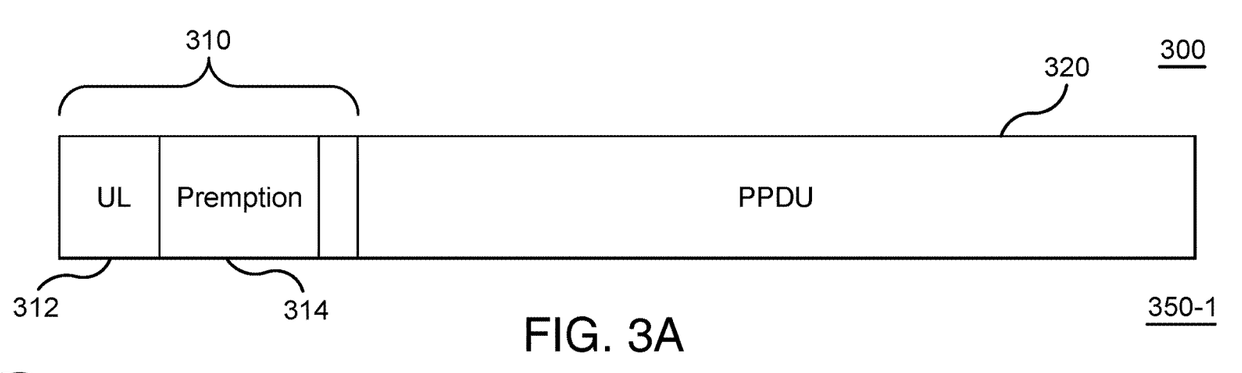
FIGS. 3A-C illustrate preemption transmissions, according to embodiments described herein.

FIGS. 3A-C illustrate preemption transmissions, according to embodiments described herein. FIG. 3A includes a physical layer protocol data unit (PPDU) 300 from a client device in the BSS 130. For example, the device 140 generates the PPDU 300 for preemption traffic including a header 310 which includes an uplink (UL) indication 312 and a preemption indication 314 (indicating the transmission is UL preemption traffic). The PPDU also includes a payload 320 which includes the various data and other information of the preemption traffic.

Figure 3B:
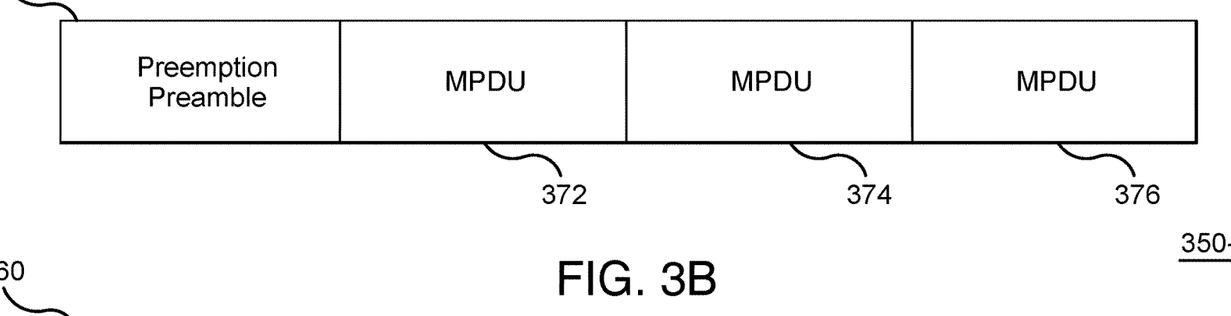
Figure 3C:
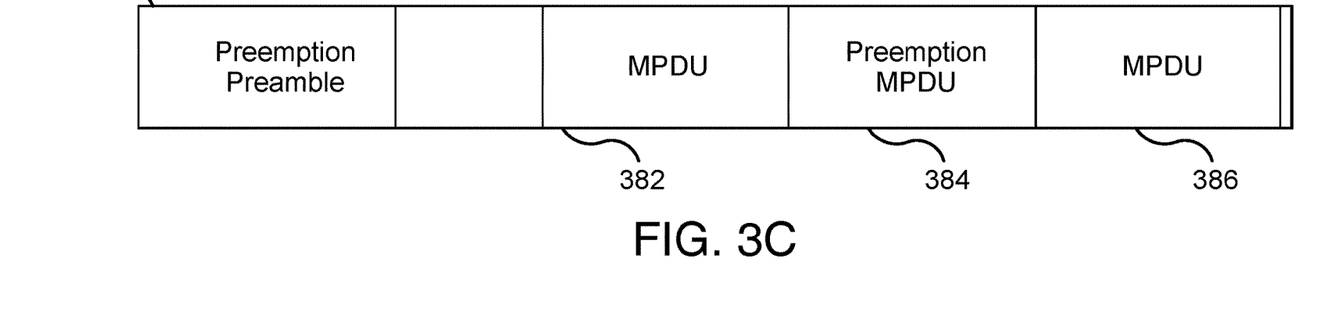

FIGS. 3B and 3C illustrate Aggregate MAC Protocol Data Unit (AMPDU) 350-1 and AMPDU 350-2. The AP 120 may generate the AMPDUs 350-1 and 350-2 with preemption preamble 360 which may indicate that each of MPDU 372, 374, and MPDU 376 is a preemption transmission (e.g., a downlink (DL) preemption transmission). The preemption preamble includes an indication that it is a DL PPDU, such that devices, such as the devices 35 do not attempt to transmit over the top of the DL PPDU. In another example, the AP 120 generates the AMPDU 350-2 where the MPDU 382 and 386 are not preemption MPDUs and the MPDU 384 is a preemption MPDU.

Figure 4:
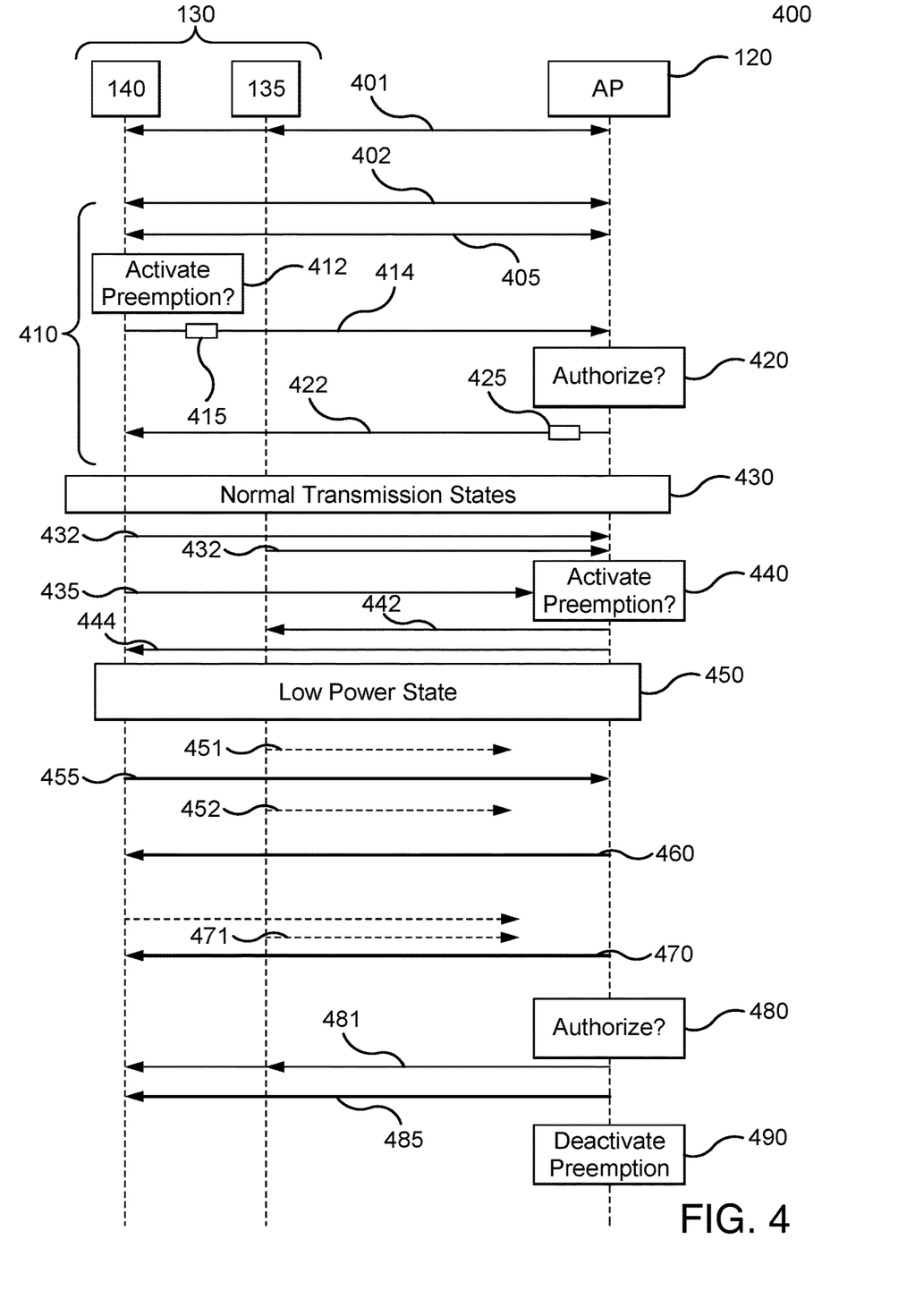
FIG. 4 illustrates a system flow diagram, according to one embodiment.
Figure 5:
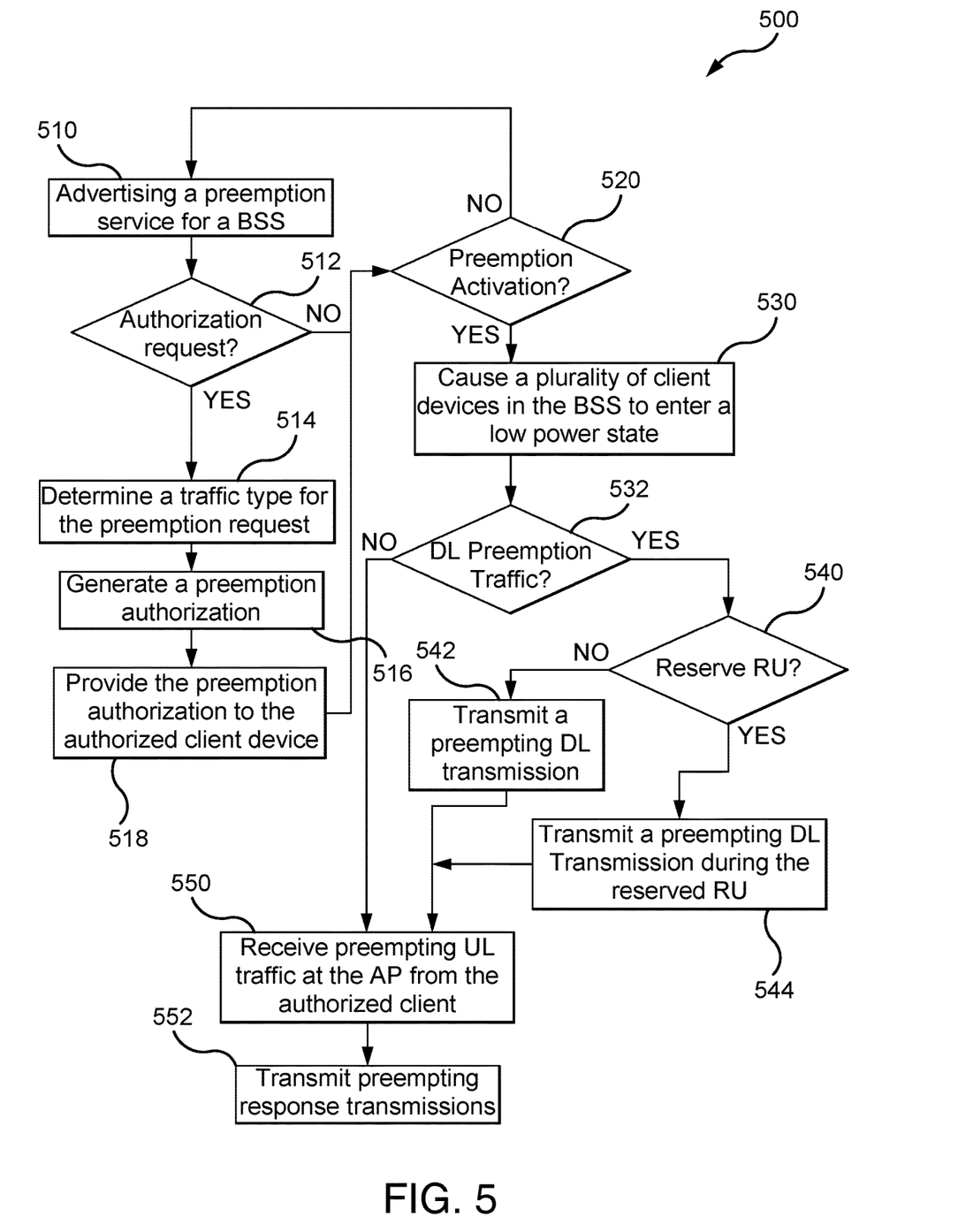
FIG. 5 is a method for providing a preemption service at an Access Point, according to one embodiment.
Figure 6:
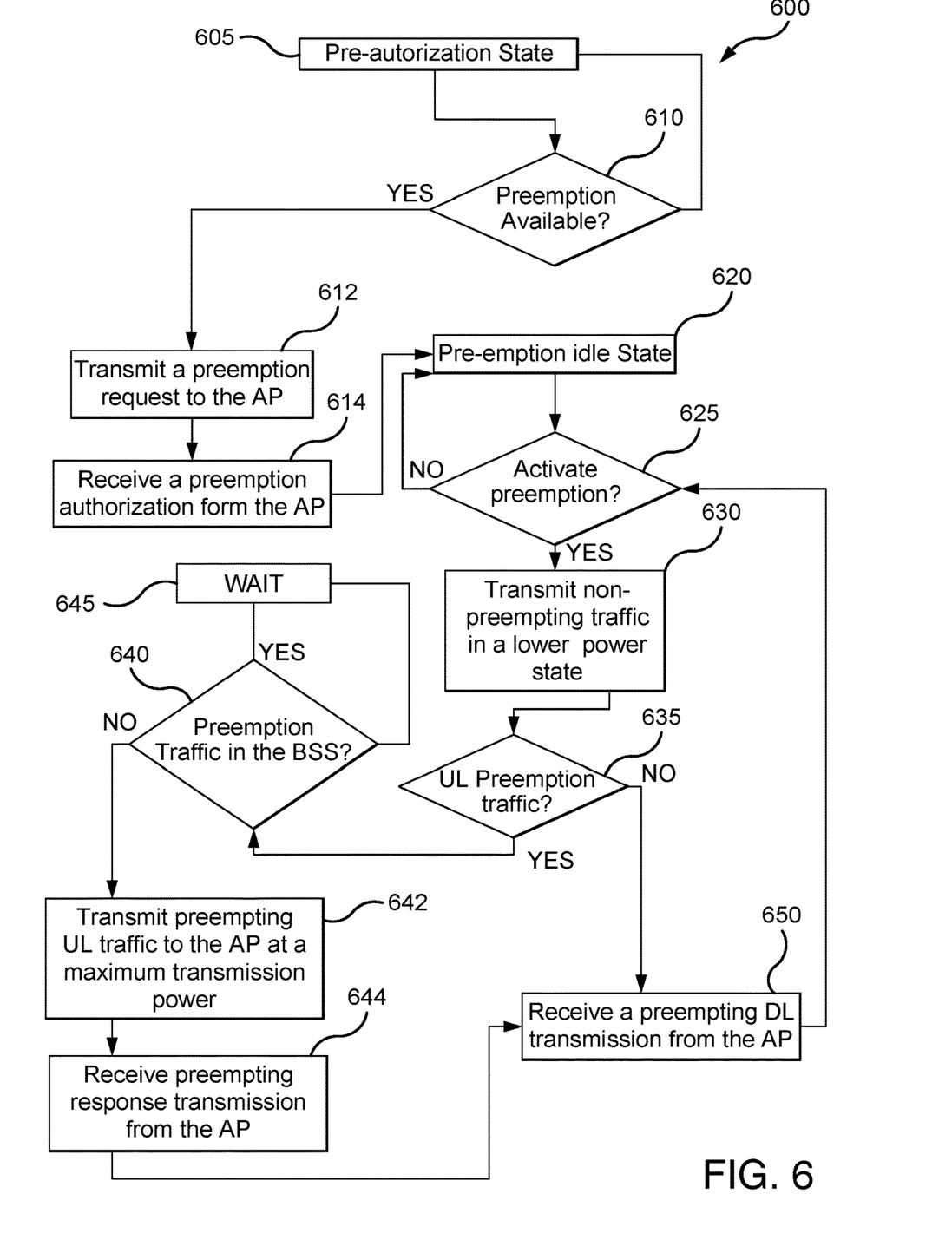
FIG. 6 is a method for participating in a preemption service at a client device, according to one embodiment.

To provide and manage the preemption service for the BSS 130, the AP 120, in conjunction with other network devices such as the network controller 110 and the devices 135 and 140, performs the processes described in more detail in relation to FIGS. 4-6.

FIG. 4 illustrates a system flow diagram, according to one embodiment. FIG. 5 is a method for providing a preemption service at an Access Point, according to one embodiment. FIG. 6 is a method for participating in a preemption service at a client device, according to one embodiment. For ease of illustration and discussion, the methods 500 and 600 will be discussed in parallel with system flow 400 in FIG. 4. Also for ease of discussion, method 500 performed by an AP will be discussed separately from method 600 performed by a client device; however, the methods may be performed in conjunction with each other by the respective devices (as shown in system flow 400).

Method 500 begins at block 510, where the AP 120 enters a standard operation state and advertises a preemption service for a BSS. For example, at step 401 in FIG. 400, the AP 120 communicates with other devices in the BSS 130, including devices 135 and device 140 via standard wireless communication protocols. In the standard operation state, the AP 120 provides control and wireless communication access for the devices in the BSS 130 and the devices in the BSS 130 communicate with the AP 120 using standard protocols. In some examples, the AP indicates that it is capable of supporting a preemption state, but that state is not currently activated. As described herein, activation of the preemption service causes a lower Tx power at each device connected to the AP. In order to provide optimum communication in the BSS, the AP may only activate the preemption service when it is needed.

In some examples, the standard operation state may include various devices, such as device 135, in the BSS 130 capable of generating preemption traffic. Each of various devices might always generate traffic that merits a preemption service, or might generate traffic that merits a preemption service only once a particular application is started, or some other condition. Such a device might request an authorization for pre-emption service for such traffic at first association or the application might request authorization for pre-emption service for such traffic once the application starts. The AP 120, according to its preemption service policies and other configurations, may grant or deny such a request for pre-emption service as described herein.

In an example where the AP has one or more clients with a granted request for pre-emption service, the AP enables the preemption state. The AP may enable preemption state in other circumstances also. For example, the any of the devices 135 may be authorized to transmit preemption traffic during the active preemption state as described herein. In some examples, the step 401 is before an association sequence with the device 140 (i.e. the device 140 is not yet a part of the BSS 130). In some examples, the device 140 is a part of the BSS 130, but does not have preemption authorization for at least some of its traffic that merits a preemption service. In one example, the device 140 is a part of BSS 130 at step 401, and is authorized for preemption for one type of traffic (e.g., traffic that merits preemption from a first application), but not authorized for preemption for a second type of traffic (e.g., traffic that merits preemption from a second application).

At block 510, the AP 120 determines whether to enter the BSS into an active preemption state. For example, the AP 120 may receive a preemption state activation request from an authorized device in the BSS 130, indicating that the authorized device has started a service or application that is capable of generating priority or preemption traffic to transmit. In another example, the AP 120 may enter a preemption state periodically, according to control settings on the AP 120, or according to external control signals (e.g., an indication from the network controller 110 to enter a preemption state) (this process will be discussed in more detail in relation to step 440 below). In some examples, when a preemption state is not needed at block 512, the method 500 may proceed back to the block 520.

At block 510, the AP 120 advertises a preemption service capability for a BSS associated with the AP. In some examples, the AP periodically advertises the preemption service. For example, the AP 120 advertises the preemption service to connected devices in the BSS 130 according to a determined time. In some examples, the AP 120 advertises the preemption service as part of an association sequence connecting a device to the BSS 130. For example, at steps 402 in system flow 400, the AP 120 enters into an association sequence with the device 140. In some examples, the association sequence includes various communications between the device 140 and the AP 120 to join the device 140 to the network 100 and the BSS 130. In another example, the AP 120 determines from the communications at step 402 whether the device 140 is capable of transmitting preemption traffic which indicates its potential participation in a preemption service. In some examples, the device 140 may also solicit a preemption service from the AP 120 at step 402.

Steps 405-422 of system flow 400 illustrate authorization process 410 for authorizing the device 140 as an authorized client in the preemption service at AP 120. At step 405, the AP 120 advertises the preemption service to the device 140 (and other devices in the BSS 130). In some examples, devices in the BSS 130, including the device 140, are not able to join the preemption service as preempting devices or may not have any preempting or priority traffic that requires the improved latency of the preemption service. For example, the device 140 or device 135 may not be enabled to transmit at a higher Tx for preemption traffic as described in relation to FIGS. 1 and 2C above and in relation to method 600 in FIG. 6 below.

In some examples, the device 140 or devices 135 may also not have any preemption traffic (e.g., no application on the device has increased latency or reliability requirements which would require preemption in the network 100.) In these examples, the devices in the BSS 130 will not transmit a preemption authorization request to the AP 120. In another example, a device capable of participating in the preemption service and having preemption traffic will transmit a preemption authorization request to the AP 120. At step 412, the device 140 determines whether to request preemptions and at step 414 transmits a preemption authorization request 415 to the AP 120.

Returning back to method 500, at block 512, the AP 120 determines whether a preemption authorization request has been received. In an example where no request is received the method 500 proceeds to block 520 as described below. In some examples, upon receiving a preemption authorization request from a client device in the BSS, method 500 proceeds to block 514-block 518 where the AP 120 authorizes the client device to transmit preempting traffic at a maximum power during a preemption state, as shown in step 420 in system flow 400.

For example, at block 514 the AP 120 determines a traffic type for the preemption authorization request. In some examples, the traffic type is included in the preemption authorization request 415 received from the requesting client device. For example, the traffic type may include traffic from a specific application on the requesting device, traffic with a given quality of service (QOS) or latency specification, etc. In some examples, a device in the BSS 130 may be authorized for preemption traffic for one traffic type and request preemption authorization for a second or different traffic type. In some examples, the traffic type may include a general request covering more than one type of network traffic transmitting from the requesting device.

In some examples, the AP 120 may determine to grant preemption authorization to the device 140, but may also deny the request or grant authorization which differs from the request made from the device 140. For example, the AP 120 may receive a request for general preemption authorization, but only grant authorization for a specific traffic type(s). The AP 120 may also deny authorization to the device 140. For example, when the device 140 is already a preemption device for a different type of traffic from the request or if too many devices in the BSS 130 are authorized as preemption devices, the AP 120 may not authorize the device 140 for the preemption authorization request 415. In an example where the AP 120 is authorizing the device 140 to send preemption traffic, method 500 proceeds to block 516.

At block 516, the AP 120 generates a preemption authorization for the requesting device. For example, at step 420, the AP 120 generates authorization 425. In some examples, the preemption authorization is only traffic of the traffic type requested from the authorized client device such that the device cannot transmit traffic outside of the traffic type as preemption traffic. In some examples, the authorized client device is also only allowed to transmit over non-preempting UL network traffic as described in relation to FIG. 6. At block 518, the AP 120 provides the preemption authorization to the authorized client device and returns to block 510 and advertises a preemption service capability for a BSS. For example, at step 422 the AP 120 transmits the authorization 425 to the device 140 and both the AP 120 and the BSS 130 enters a normal transmission state at step 430. In some examples, the normal transmission state includes the transmission states shown in FIG. 2A, where each device is transmitting according to respective maximum Tx powers or other device specific controls at steps 432.

Returning back to block 510 the AP 120 determines whether to activate the preemption state for the BSS 130. In some examples, the AP 120, at step 440, may activate the preemption state according to a given periodicity in the network 100 or according to control signals from the network controller 110. In another example, the AP 120 may activate the preemption service in response to a request from an authorized device received at step 435.

At block 530 the AP 120 activates the preemption state for the BSS by causing a plurality of client devices in the BSS to enter a low transmit power state to provide for preempting traffic in the BSS. For example, at steps 442 and 444 the AP 120 instructs the devices in the BSS 130 transmit all traffic or at least non-preemption traffic at 15-20 dB less than a respective maximum transmission power in the low transmit power state at step 450. In some examples, the AP 120 also causes the plurality of client devices in the BSS (including the AP 120) to transmit short DL and UL transmissions in an alternating pattern.

At block 532, the AP 120 determines whether the AP has any DL preemption traffic to transmit in the in the wireless network. For example, the AP communication received from an external network or other source that is destined for a device in the BSS 130 may include latency requirements that causes the AP 120 to preempt other network traffic and transmissions in the network 100.

At block 540, the AP 120 determines whether to reserve RU space for preemption traffic transmitted from the AP 120 and when a reserve RU is needed, reserves a resource unit (RU) for AP preemption transmissions For example, at step 480 in the system flow 400, the AP 120 reserves a RU for preemption traffic for PPDUs where the AP needs to send preemption traffic to a client in the BSS 130, where the AP 120 is not already transmitting to the client at the time the preemption traffic should be transmitted. The AP 120 signals this RU to the BSS 130 as reserved at step 481. In some examples, the RU is divided into blocks (e.g., signaled for BSS/signaled for this RU, etc.) and an AMPDU is sent to a different recipient at the start of each block as shown in more detail in relation to FIGS. 3B and 3C. In some examples, the AP may send an AMPDU and each MDPU is potentially for a different recipient. At block 544 at step 485, the AP 120 transmits a preempting DL transmission to a client, such as the device 140, in the BSS during the reserved RU.

In another example, where the AP 120 does not reserve an RU for preemption DL transmissions, method 500 proceeds to block 542 where the AP 120 transmits a preempting DL transmission over a non-preempting UL transmission. For example, the AP 120 inserts a preemption MAC Protocol Data Unit (MPDU) into an Aggregate MAC Protocol Data Unit (AMPDU) for the intended recipient in any DL PPDU at any point. In some example, the AP 120 transmits the DL preemption traffic at step 470 over UL traffic from the BSS 130 at step 471 in system flow 400.

In some examples, when no DL preemption traffic is present at block 532 and upon transmitting preemption DL transmission at block 542 and 544, method 500 proceeds to block 550 where the AP 120 receives preempting UL traffic at the AP from the authorized client. The AP 120 also transmits control response frames from the preempting UL traffic from the authorized client device as preempting response transmissions at block 552. For example, at step 455 the device 140 transmits preemption traffic over non-preemption traffic sent by the devices 135 at steps 451 and 452 such that the preemption traffic is received the AP 120 as shown in FIG. 3C. In some examples, a preamble of the preemption traffic PPDU reports whether the PPDU is as preemption PPDU. At step 460, the AP 120 transmits a control response frames (Ack/Block Ack (BA), etc.) in response to the traffic received at step 455. In some examples, the control response frames are also marked as preemption traffic as discussed in relation to FIGS. 3B and 3C.

In some examples, the AP 120 deactivates the preemption service at step 490 by indicating an end of the service to the BSS 130. In some examples, the AP 120 deactivates the preemption service after a given activation time or according to control signals received from the network controller 110, etc.

With reference to the corresponding actions of the method 500 at the client device, method 600 begins at block 605 where the device 140 operates in a pre-authorization state. For example, the device 140 transmits at a standard Tx power when connected to the AP 120 as part of the BSS 130 or prior to connection to the AP 120 and the BSS 130 as described above in relation to step 401.

At block 610, the device 140 determines that it needs preemption service for the BSS 130 associated with the AP 120. In some examples, when a preemption service is not available or enrollment into the preemption service is not available at a given time, the method 600 proceeds back to block 605. When a preemption service is available, the method 600 proceeds to block 612, where the device 140 transmits a preemption authorization request to the AP 120. In some examples, the device 140 transmits a preemption authorization request to the AP during an association sequence as described in relation to authorization process 410 above.

At block 614, the device 140 receives a preemption authorization from the AP 120 and enters a pre-emption idle state at block 620. In some examples, the preemption authorization limits which type of traffic may be sent as preemption traffic. For example, the preemption authorization request may include a traffic type for preemption, where the authorized client device is authorized to preempt network traffic for only traffic of the traffic type. Additionally, the preemption authorization may include that the authorized client device is allowed to transmit over only non-preempting UL network traffic.

At block 625, the device 140 determines whether the preemption service is active for the BSS 130. In one example, the AP 120 may activate the preemption service upon authorizing the client device at block 614. For example, at step 422, the authorization 425 may include an indication that the preemption service is active (e.g., already active or activating). In this example, system flow 400 proceeds directly to step 450. In some examples, the device 140 may transmit a preemption state request to the AP 120 for the BSS to activate the preemption service as shown at step 435 in system flow 400. In some examples at step 444, the device 140 may receive an indication of an active preemption state for the BSS based on the request from the device 140 or other trigger at the AP 120. When the AP 120 indicates an active preemption service state for the BSS 130, method 600 proceeds to block 630.

At block 630, the device 140 transmits non-preempting traffic in a low transmit power state as shown in step 450. In some examples, the low transmit power state includes transmitting non-preempting traffic 15-20 dB less than a maximum transmission power of the device 140. In some examples, the device 140 may also transmit short UL transmissions in an alternating or somewhat alternating pattern with short DL transmissions from the AP 120 during the active preemption state.

At block 635 the device 140 determines whether the device has any preemption traffic to transmit over the network 100. When preemption traffic is ready to be transmitted from the device 140, method 600 proceeds to block 640. At block 640, the device 140 inspects network traffic in the BSS 130 and upon determining the network traffic is non-preempting traffic, transmits the preempting traffic over the network traffic in the BSS at a maximum transmission power at block 642. In an example where there is preemption traffic in the BSS at block 640 (e.g., the inspected network traffic indicates that it UL preemption traffic or DL traffic), the method 600 proceeds to block 645. At block 645, the device 140 waits for a given period (e.g. sufficient time for the inspected traffic to transmit to a given destination) and then proceeds back to block 640 to re-inspect network traffic in the BSS 130.

At block 644, the device 140 receives a preempting response transmission from the AP. For example, the device 140 transmits preemption traffic at step 455 and receives a preemption response at step 460.

Method 600 proceeds to block 650 where the device 140 receives any DL preemption traffic from the AP 120. In some examples, there may be no DL preemption transmissions from the AP and the method 600 proceeds directly back to block 625. In some examples, the device receives a preempting DL transmission from the AP during a resource unit (RU) reserved for AP preemption transmissions as shown in steps 480-485. In some examples, the device 140 also receives a preempting DL transmission from the AP over a non-preempting UL transmission as shown in step 470. The method 600 returns to block 625 to continue in the preemption state or to leave the preemption state according to control signals from the AP 120. For example, the device 140 may stay in the preemption state until the AP 120 signals the preemption service is deactivated at step 490 of system flow 400.

Figure 7:
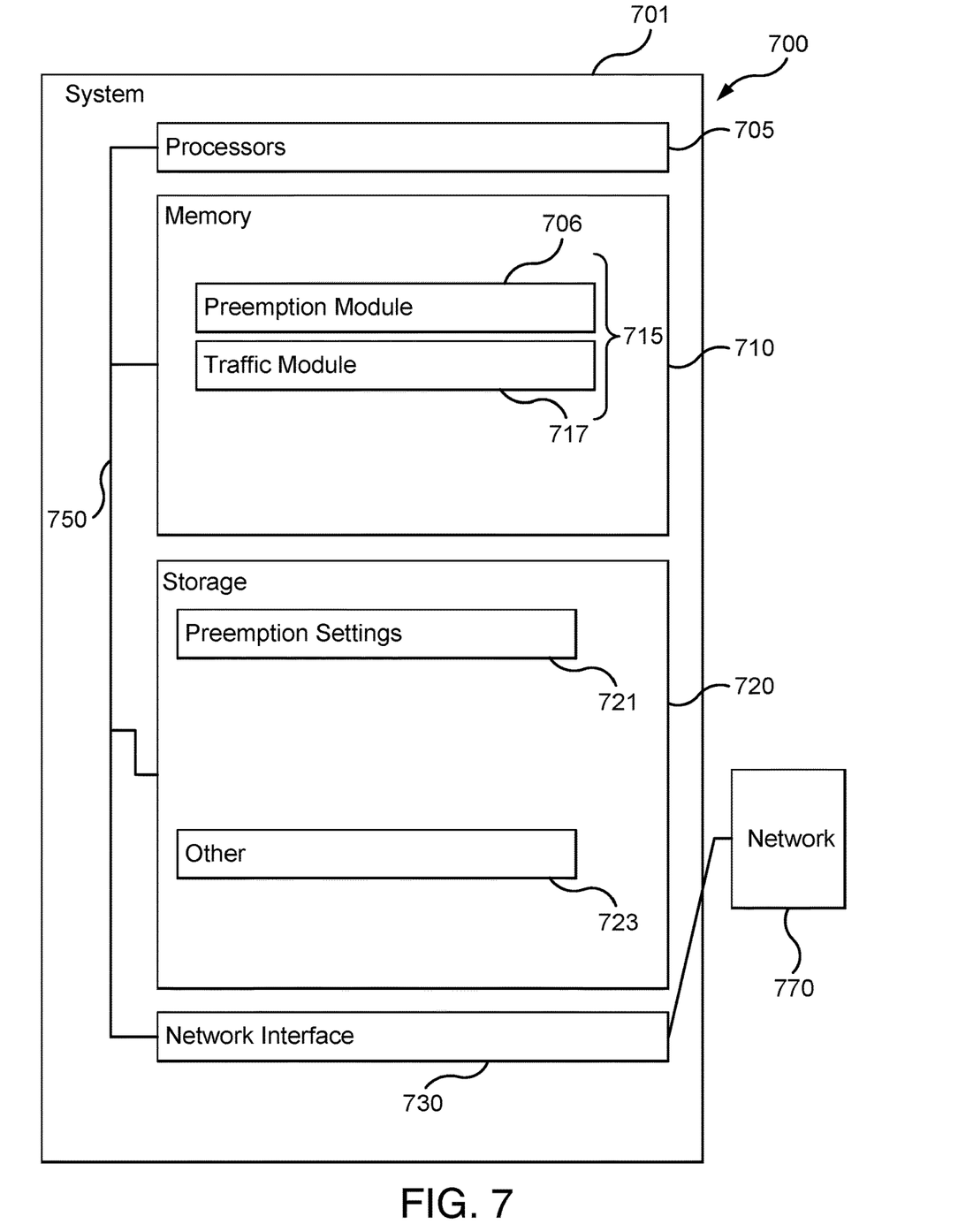
FIG. 7 is a block diagram of a device, according to one embodiment.

FIG. 7 is a block diagram of a device 701 for a preemption service, according to one embodiment. Arrangement 700 and the device 701 may include the AP 120 configured to execute the various functions of authorizing and activating a preemption service in a wireless network as described herein. In another example, the arrangement 700 and the device 701 may include the device 140 configured to execute the various functions of requesting preemption authorization and participating in a preemption service in a wireless network as described herein. The device 701 is shown in the form of a general-purpose computing device, but may include a server, device, and/or application executing on a cloud network. The components of device 701 may include, but are not limited to, one or more processing units or processors 705, a system memory 710, a storage system 720, network interface 730 connecting the device 701 to external network 770, and a bus 750 that couples various system components including the system memory 710 and storage system 720 to processors 705 along with various input/output components (not shown). In other embodiments, arrangement 700 is distributed and includes a plurality of discrete computing devices that are connected through wired or wireless networking.

Bus 750 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Device 701 typically includes a variety of computer system readable media (e.g., a non-transitory computer-readable storage medium). Such media may be any available media that is accessible by device 701, and it includes both volatile and non-volatile media, removable and non-removable media.

System memory 710 can include computer system readable media in the form of volatile memory, such as random access memory (RAM) and/or cache memory. Device 701 may further include other removable/non-removable, volatile/non-volatile computer system storage media. By way of example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 750 by one or more data media interfaces. As will be further depicted and described below, system memory 710 may include at least one program product having a set (e.g., at least one) of program modules that are configured to carry out the functions of various embodiments described herein.

Device 701 may further include other removable/non-removable, volatile/non-volatile computer system storage media. In some examples, storage system 720 may be included as part of system memory 710 and may typically provide a non-volatile memory for the networked computing devices, and may include one or more different storage elements such as Flash memory, a hard disk drive, a solid state drive, an optical storage device, and/or a magnetic storage device. For example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 750 by one or more data media interfaces. Storage system 720 may include media for preemption settings 721, and other information 723 stored for access and use by the Device 701.

The system memory 710 may include a plurality of program modules 715 for performing various functions described herein. The program modules 715 generally include program code/program instructions that is executable by one or more of the processors 705. As shown, program modules 715 include preemption module 716 and traffic module 717. The program modules 715 may also interact with each other and storage system 720 to perform certain functions as described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   advertising, at an Access Point (AP), a preemption service capability for a basic service set (BSS) associated with the AP;
   upon receiving an authorization request from a client device in the BSS, authorizing the client device to transmit preempting traffic at a high power during a preemption state;
   activating the preemption state for the BSS by causing a plurality of client devices in the BSS to enter a low transmit power state to provide for preempting traffic in the BSS;
   receiving preempting (UL) traffic at the AP from the authorized client device that was transmitted at the high power; and
   transmitting control response frames from the preempting UL traffic from the authorized client device as preempting response transmissions.

2. The method of claim 1, wherein the AP receives the authorization request from the client device during an association sequence.

3. The method of claim 1, wherein the authorized client device is allowed to transmit over only non-preempting UL network traffic.

4. The method of claim 1, wherein authorizing the client device further comprises:
   determining a traffic type for the authorization request;
   generating a preemption authorization for only traffic of the traffic type from the authorized client device; and
   providing the preemption authorization to the authorized client device.

5. The method of claim 1, wherein activating the preemption state further comprises:
   causing the plurality of client devices in the BSS to transmit short downlink (DL) transmissions.

6. The method of claim 1, wherein activating the preemption state further comprises:
   causing the plurality of client devices in the BSS to transmit uplink (UL) transmissions in an alternating pattern.

7. The method of claim 1, wherein the AP causes the plurality of client devices in the low transmit power state to transmit at a respective transmission power level based on a respective proximity of each client device to the AP, wherein each client device in the plurality of client devices is heard by the AP at a same power level.

8. The method of claim 1, wherein the low transmit power state at each device in the plurality of client devices comprises transmitting 15-20 decibels (dB) less than a respective maximum transmission power.

9. The method of claim 1, further comprising:
   reserving a resource unit (RU) for AP preemption transmissions; and
   transmitting a preempting DL transmission to a client in the BSS during the reserved RU.

10. The method of claim 1, further comprising:
    transmitting a preempting downlink (DL) transmission over a non-preempting UL transmission.

11. A method comprising:
    determining, at a client device, a preemption service capability is available for a basic service set (BSS) associated with an access point (AP);
    transmitting an authorization request to the AP;
    receiving a preemption authorization from the AP;
    upon receiving an indication of an active preemption state for the BSS:
      transmitting non-preempting traffic in a low transmit power state;
      transmitting preempting uplink (UL) traffic to the AP over non-preempting traffic in the BSS at a high transmission power; and
      receiving preempting response transmission from the AP.

12. The method of claim 11, wherein the client device transmits authorization request to the AP during an association sequence.

13. The method of claim 11, wherein the client device is allowed to transmit over only non-preempting UL network traffic, and wherein the method further comprises:
    inspecting network traffic in the BSS; and
    upon determining the network traffic is non-preempting traffic, transmitting the preempting traffic over the network traffic in the BSS.

14. The method of claim 11, wherein the authorization request comprises a traffic type for preemption, wherein the client device is authorized to preempt network traffic for only traffic of the traffic type.

15. The method of claim 11, wherein during the active preemption state the method further comprises:
    transmitting short uplink (UL) transmissions in an alternating pattern with downlink (DL) transmissions.

16. The method of claim 11, wherein transmitting non-preempting traffic comprises transmitting the non-preempting traffic at 15-20 decibels (dB) less than the high transmission power.

17. The method of claim 11, further comprising:
receiving a preempting DL transmission from the AP during a reserved resource unit (RU) for AP preemption transmissions.

18. The method of claim 11, further comprising:
receiving a preempting downlink (DL) transmission from the AP over a non-preempting UL transmission.

19. The method of claim 11, further comprising transmitting a preemption state request to the AP for the BSS to activate the preemption service.

20. An access point (AP), comprising:
a processor; and
a memory comprising instructions which, when executed on the processor, performs an operation, the operation comprising:

advertising a preemption service capability for a basic service set (BSS) associated with the AP;

upon receiving an authorization request from a client device in the BSS, authorizing the client device to transmit preempting traffic at a high power during a preemption state;

activating the preemption state for the BSS by:

causing a plurality of client devices in the BSS to enter a low transmit power state to provide for preempting traffic in the BSS;

receiving preempting (UL) traffic at the AP from the authorized client device; and transmitting control response frames from the preempting UL traffic from the authorized client device as preempting response transmissions.

* * * * *